United States Patent Office 2,912,432
Patented Nov. 10, 1959

2,912,432

3-OXO AND 3-HYDROXY DERIVATIVES OF 18-DI-METHYL-AMINOPREGN-20-ENES AND INTERMEDIATES

Raphael Pappo, Skokie, and John S. Baran, Chicago, Ill., assignors to G. D. Searle & Co., Chicago, Ill., a corporation of Delaware No Drawing. Application November 28, 1958
Serial No. 776,738

7 Claims. (Cl. 260—239.5)

The present invention relates to 3-oxo and 3-hydroxy derivatives of 18-dimethylaminopregn-20-enes and to intermediates in their preparation from conessine.

In the copending application of Raphael Pappo, Serial No. 736,963, filed May 22, 1958, there is described the preparation of 3β-hydroxycon-5-enine from conessine. Hydrogenation of this compound or its mineral acid salt in the presence of Raney nickel or a nobel metal catalyst yields a mixture of the 5α and 5β isomers of 3β-hydroxy-conanine, the allo isomer being the predominant product. The 3α-isomers are obtained by first hydrogenating 3-oxo-con-4-enine (also described in the above Pappo application), and then reducing the 3-oxoconanine formed. These 3-hydroxyconanine isomers of the formula

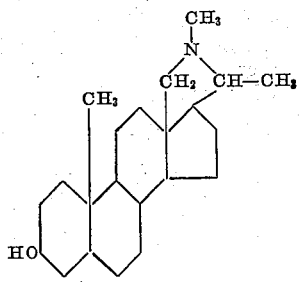

and their salts can be quaternized, typically with methyl halides to produce hypotensive agents. Hofmann degradation of the quaternary salts with base, typically with an alkali metal alkoxide, yields the 3α- and 3β-hydroxy derivatives of the 18-dimethylaminopregn-20-enes of the 5α- and 5β-series of the general formula

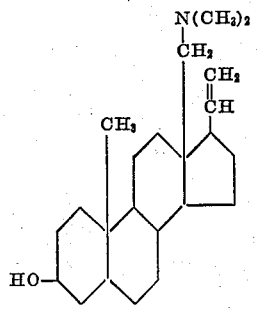

Oxidation of this 3-hydroxy compound with chromic acid yields 18-dimethylaminopregn-20-en-3-one, a compound which has progesterone-like action.

This ketone can also be obtained by another procedure employing as a starting material 3β-hydroxyconanine. This base can be quaternized to form the methyl p-toluenesulfonate which is then oxidized with chromic acid. The product is converted to the methohalide. Treatment of such a methohalide, typically the methiodide with methanol and hydriodic acid yields the methiodide of 3,3-dimethoxyconanine, a ganglion blocking agent. Hofmann degradation yields the 3,3-dimethoxy-18-dimethyl-aminopregn-20-ene methohalide. On treating with acid the ketal is converted to the 18-dimethylaminopregn-20-en-3-one. This ketone can be reduced to the 3-hydroxy compound by reduction with an alkali metal aluminum hydride or borohydride.

The compounds of this invention are anti-fungal agents and are particularly active against *Trichophyton mentagrophytes*.

The bases of this invention form salts with inorganic and strong organic acids, including sulfuric, phosphoric, hydrochloric, hydrobromic, hydroiodic, sulfamic, citric, lactic, maleic, nicotinic, malic, succinic, tartaric, cinnamic, acetic, benzoic, gluconic, ascorbic, and related acids. It also forms quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzene sulfonate, ethyl toluenesulfonate, ethylene chlorohydrin, propylene chlorohydrin, allyl chloride, methallyl bromide and crotyl bromide.

The invention will be described in further detail in the following examples which are given for the purpose of illustration only and are not to be construed as limiting the invention in spirit or in scope. In these examples quantities are indicated as parts by weight.

*Example 1*

To a solution of 5 parts of 3-hydroxycon-5-enine and 50 parts of methanol are added 100 parts of 0.6 M hydrochloric acid and 0.15 part of platinum oxide. The mixture is stirred until hydrogen ceases to be absorbed. Methanol is added to the mixture until the product which has precipitated during the hydrogenation is dissolved. The mixture is filtered and the filtrate is treated with excess aqueous sodium hydroxide, concentrated on a steam bath, and cooled. The product, 3β-hydroxy-5α-conanine, is collected by filtration, washed with water, and dried. The compound, when crystallized from ether and petroleum ether, melts at about 169–171° C. The rotation of a 1% chloroform solution $\alpha_D$ is +51.4°. It has the structural formula

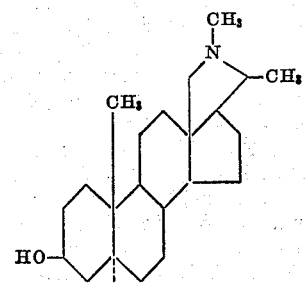

*Example 2*

A solution of 13 parts of 3-hydroxyconanine, 14 parts of methyl p-toluenesulfonate, and 75 parts of benzene is refluxed for eight hours. The solution is cooled and diluted with ether. The product, 3-hydroxyconanine methyl p-toluenesulfonate, is collected by filtration and dried. To a stirred solution of the methotoluenesulfonate in 100 parts of acetic acid are added 10 parts of a chromic acid and aqueous sulfuric acid solution (prepared by mixing 26.7 parts of chromic acid, 100 parts of water, and 12.5 parts of concentrated sulfuric acid). The temperature of the mixture is not permitted to rise above 20° C. After another three minutes 5 parts of isopropanol are added. The mixture is distilled in vacuo at a low temperature to remove the acetic acid and the residue is dissolved in water. The aqueous solution is then saturated with sodium iodide and extracted with chloroform. The extract is washed with water and saturated aqueous sodium bicarbonate, dried over sodium sulfate, and evaporated to dryness. Crystallization of the crude product from a mixture of dichloromethane and acetone yields 3-oxoconanine methiodide which melts at about 285–292° The rotation of a 1% chloroform solution $\alpha_D$ is +35.7°.

A solution of 7.8 parts of the methiodide of 3-oxoconanine, 250 parts of methanol, and 0.25 parts of 47% hydriodic acid is permitted to stand at room temperature for one day. The solution is then stirred with 1 part of potassium bicarbonate and evaporated to dryness in vacuo. The residue is extracted thoroughly with chloroform and the chloroform extract is dried over sodium sulfate and evaporated to dryness in vacuo. The crude product, when crystallized from dichloromethane and acetone yields 3,3-dimethoxyconanine methiodide which melts at about 270–274°. The rotation of an 0.477% chloroform solution $\alpha_D$ is +24.2. Infrared maxima are observed at 3.40, 3.49, 6.90, 9.04, 9.54 and 11.42 microns.

*Example 3*

To a solution of potassium tertiary butoxide (prepared by dissolving 3.2 parts of potassium metal in 300 parts of anhydrous tertiary butanol) are added 6.1 parts of 3,3-dimethoxyconanine methiodide. The mixture is refluxed for 4 hours, cooled, and evaporated to dryness in vacuo. The residue is thoroughly extracted with dichloromethane. The extract is dried over sodium sulfate and evaporated to dryness. Crystallization of the oily residue is induced by scratching and cooling. When the crude crystalline residue is recrystallized from acetonitrile it yields 3,3-dimethoxy-18-dimethylamino-5α-pregn-20-ene which melts at about 64–65°. The rotation of a 1% chloroform solution is +31.5°. Infrared maxima are observed at 3.40, 3.61, 6.11, 9.00, 9.13 and 9.49 microns.

*Example 4*

To a solution of 4.8 parts of 3,3-dimethoxy-18-dimethylamino-5α-pregn-20-ene methiodide and 40 parts of acetone is added 1 part of concentrated hydrochloric acid. The resulting precipitate is collected by filtration, washed with acetone, and dried. 18-dimethylamino-5α-pregn-20-ene-3-one hydrochloride thus obtained melts at about 240–245°. Infrared maxima are observed at 3.40, 4.06, 5.83, 6.09, 8.65 and 9.73 microns.

The salt is then dissolved in 150 parts of water and the solution is treated with excess aqueous sodium hydroxide and extracted with petroleum ether. The extract is dried over sodium sulfate and evaporated to dryness in vacuo. The residue, which crystallizes on cooling is recrystallized from methanol at −5° to give 18-dimethylamino-5α-pregn-20-ene-3-one which melts at 59–60°. The rotation of a 1% chloroform solution $\alpha_D$ is +53°. Infrared maxima in chloroform solution are observed at 3.39, 3.48, 5.84, 6.11, 7.96, 9.65 and 10.94 microns. The compound has the formula

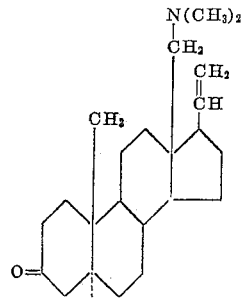

*Example 5*

A solution of 1 part of 3β-hydroxy-5α-conanine, 30 parts of methanol, and 5 parts of methyl iodide is refluxed for 4 hours and evaporated to dryness. The product is stirred with acetone for 1 hour, collected by filtration, washed with acetone, and dried. Crystallization of the crude product from dichloromethane and acetone yields 3β-hydroxy-5α-conanine methiodide which melts at about 267–270°. The rotation of a 1% chloroform solution $\alpha_D$ is +21.5°.

An anhydrous solution of 0.5 parts of potassium in 50 parts of tertiary butanol is added to 1 part of the foregoing methiodide. The mixture is refluxed for 4 hours, cooled and taken to dryness in vacuo. The residue is exhaustively extracted with dichloromethane and the extract is dried over anhydrous sodium sulfate and taken to dryness. There is thus obtained 18-dimethylamino-5α-pregn-20-en-3β-ol which, recrystallized from ether and petroleum ether, melts at about 155–156° C. The compound has the structural formula

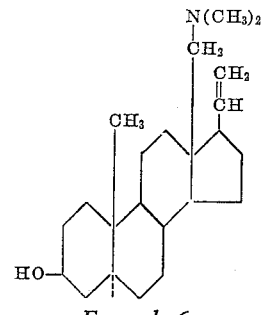

*Example 6*

To a stirred solution of 13 parts of 18-dimethylamino-5α-pregn-20-en-3β-ol, 100 parts of acetic acid and 1 part of concentrated sulfuric acid are added over a period of 5 minutes, 9.75 parts of a chromic acid and sulfuric acid solution (prepared by mixing 12.5 parts of sulfuric acid, 100 parts of water, and 26.7 parts of chromic acid). The temperature of the mixture is not permitted to rise above 20° C. The mixture is then treated with 5 parts of 2-propanol and diluted with water. The solution is made slightly alkaline at 0° C. with aqueous sodium hydroxide. The mixture is filtered and the filtrate is extracted with petroleum ether. The organic extract is washed with water, dried over sodium sulfate, and evaporated to dryness in vacuo. Crystallization of the residue from methanol at −5° yields 18-dimethylamino-5α-pregn-20-en-3-one.

*Example 7*

To a stirred mixture of 3.8 parts of lithium aluminum hydride and 250 parts of ether is slowly added a solution of 4.45 parts of 18-dimethylamino-5α-pregn-20-en-3-one and 50 parts of ether. The mixture is stirred for 30 minutes and then cautiously treated with a solution of 4 parts of water in 25 parts of tetrahydrofuran, 3 parts of 20% aqueous sodium hydroxide, and 14 parts of water. The mixture is then filtered and the filtrate is evaporated to dryness. The crude product which melts at about 140–150° is crystallized from ether and petroleum ether to give 18-dimethylamino-5α-pregn-20-en-3β-ol which melts at about 155–156°. The rotation of a 1% chloroform solution $\alpha_D$ is +28.0°. Infrared maxima are observed at 3.09, 3.41, 3.50, 6.12, 9.61, 11.13 and 11.56 microns.

*Example 8*

A solution of 1.5 parts of 3-oxoconan-4-ene in 5 parts of acetone is adjusted to pH 6 with 30% aqueous perchloric acid. The entire mixture is brought into solution by heating to the boiling point. On cooling a precipitate forms which is collected on a filter and dried at 70° C. under reduced pressure. There is thus obtained the perchlorate of 3-oxoconan-4-ene melting at about 157–160° C., resolidifying and remelting at about 227–232° C.

A solution of 1 part of this perchlorate in 40 parts of ethanol and 10 parts of water containing 0.15 part of sodium hydroxide is stirred in a hydrogen atmosphere with 0.1 part of a 5% palladium-on-carbon catalyst. After absorption of 1 molecular equivalent of hydrogen, the mixture is filtered. The catalyst is washed with ethanol and the filtrate and the washings are combined, brought to pH 6 with dilute aqueous perchloric acid and concentrated to a small volume in an atmosphere of nitrogen. The residual gum is dissolved in aqueous methanol and allowed to crystallize. The crystals are collected on a filter, washed with aqueous ethanol, dried, and recrystallized from aqueous methanol to yield the perchloric acid salt of 3-oxo-5β-conanine in thick prisms melting at about 266–270° C. with decomposition.

The perchlorate thus obtained is suspended in excess aqueous sodium hydroxide and extracted with benzene. The extract is washed with water, dried and evaporated to yield an oil which solidifies on scratching with ether. Recrystallization from hexane yields 3-oxo-5β-conanine melting at about 133–134° C.

*Example 9*

A solution of 2.4 parts of 3-oxo-5β-conanine in 50 parts of ether is added to a stirred mixture of 3.7 parts of lithium aluminum hydride and 200 parts of ether. After 10 minutes the mixture is carefully decomposed with 3 parts of water, 4 parts of 20% aqueous sodium hydroxide and 14 parts of water. The mixture is filtered and the filtrate is evaporated to dryness under vacuum. The residue is triturated with cold petroleum ether to yield crude 3α-hydroxy-5β-conanine which, when recrystallized from petroleum ether, melts at about 132° C. Infrared maxima are observed at 3.01, 3.39, 6.87, 7.21, 8.52, 9.38 and 9.54 microns.

To a solution of 3.3 parts of this base in 5 parts of methanol is added a solution containing 1 part of perchloric acid and 50 parts of water. The mixture is then concentrated under vacuum and cooled. The resulting precipitate is collected on a filter and washed.

Upon recrystallization from water there is obtained the perchloric acid salt of 3α-hydroxy-5β-conanine melting at about 280–282° C. Infrared maxima are observed at 2.92, 3.39, 3.70, 8.70, 8.95, 9.14, 9.58, 10.0 and 10.65 microns.

*Example 10*

A solution of 1 part of 3α-hydroxy-5β-conanine, 30 parts of methanol, and 5 parts of methyl iodide is refluxed for 4 hours and then evaporated to dryness. The product is recrystallized from acetone to yield the methiodide of 3α-hydroxy-5β-conanine which melts at about 278–280° C. Maxima are observed at 2.93, 3.41, 6.90, 7.32, 9.38, 9.61, 10.46 and 10.70 microns. The compound has the structural formula

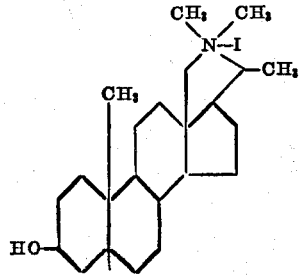

Treatment of this methiodide with potassium and tertiary butanol by the procedure of Example 5 yields 18-dimethylamino-5β-pregn-20-en-3α-ol.

Oxidation with chromic acid according to the procedure of Example 6 yields the 18-dimethylamino-5β-pregn-20-en-3-one of the structural formula

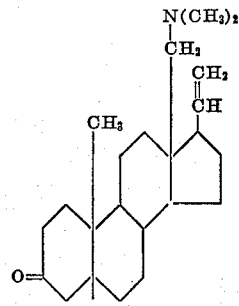

What is claimed is:
1. A compound of the structural formula

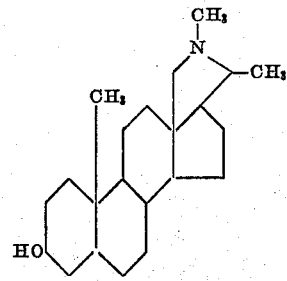

2. A compound of the structural formula

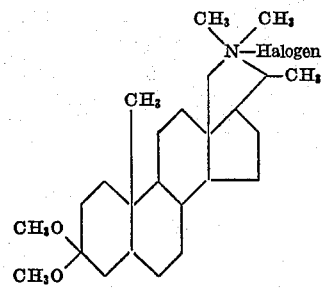

3. 3,3 - dimethoxy - 18 - dimethylamino - 5α - pregn-20-enemethohalide.
4. 18-dimethylamino-5α-pregn-20-en-3-one.
5. 18-dimethylamino-5β-pregn-20-en-3-one.
6. 18-dimethylamino-5α-pregn-20-en-3-ol.
7. 18-dimethylamino-5β-pregn-20-en-3-ol.

References Cited in the file of this patent
UNITED STATES PATENTS
2,740,781   Mueller _____ Apr. 3, 1956

OTHER REFERENCES

Haworth et al.: J. Chem. Soc., vol., 1957, pages 4973–83.

Buchschacher et al.: J.A.C.S., vol. 80, pages 2905 and 6, June 5, 1958.